United States Patent
Gomez et al.

(10) Patent No.: US 7,151,469 B2
(45) Date of Patent: *Dec. 19, 2006

(54) SURVEILLANCE SYSTEM FOR AIRCRAFT INTERIOR

(75) Inventors: Oscar Gomez, Destin, FL (US); Kemp Alan Mednick, Bradenton, FL (US)

(73) Assignee: L-3 Communications Corporation, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/074,585

(22) Filed: Mar. 8, 2005

(65) Prior Publication Data

US 2006/0238375 A1 Oct. 26, 2006

Related U.S. Application Data

(63) Continuation-in-part of application No. 10/253,279, filed on Sep. 24, 2002, now Pat. No. 6,864,805.

(51) Int. Cl.
*G08B 21/00* (2006.01)

(52) U.S. Cl. ............... 340/945; 348/143; 348/148

(58) Field of Classification Search ............... 340/945; 348/143, 117, 148; 244/1 R
See application file for complete search history.

(56) References Cited

U.S. PATENT DOCUMENTS

| | | | |
|---|---|---|---|
| 5,144,661 A | | 9/1992 | Shamosh et al. |
| 5,883,586 A | * | 3/1999 | Tran et al. ............... 340/945 |
| 6,366,311 B1 | | 4/2002 | Monroe |
| RE37,709 E | | 5/2002 | Dukek |
| 6,721,640 B1 | * | 4/2004 | Glenn et al. ............ 701/35 |
| 6,744,381 B1 | * | 6/2004 | Collins ............... 340/945 |
| 6,864,805 B1 | | 3/2005 | Gomez |
| 6,873,261 B1 | * | 3/2005 | Anthony et al. .......... 340/574 |

* cited by examiner

*Primary Examiner*—John Tweel, Jr.
(74) *Attorney, Agent, or Firm*—Malloy & Malloy, P.A.

(57) ABSTRACT

A surveillance system for monitoring activity within at least the cabin portion of the aircraft in order to alert the flight crew within the cockpit of any emergency activity including, but not limited to, highjacking or terrorist activity. A video controller assembly is interconnected between a viewing assembly and a display assembly so as to distribute image data there between. The viewing assembly includes one or more cameras disposed to selectively capture images throughout the aircraft cabin interior and deliver the captured image data to the display assembly observable by the flight crew. Activation of the system is accomplished by controlled operation of one or more portable, wireless transmitters and at least one receiver which is operationally connected to the viewing assembly and the display assembly.

17 Claims, 5 Drawing Sheets

SURVEILLANCE SYSTEM FOR AIRCRAFT INTERIOR

CLAIM OF PRIORITY

The present application is a Continuation-In-Part application of U.S. patent application having Ser. No. 10/253,279 filed on Sep. 24, 2002 incorporated herein by reference, which matured into U.S. Pat. No. 6,864,805 on Mar. 8, 2005.

BACKGROUND OF THE INVENTION

1. Field of the Invention

This invention relates to a surveillance system for visually monitoring predetermined interior portions of an aircraft in order to inform the flight crew of any emergency activity including, but not limited to, highjack attempts by terrorists.

2. Description of the Related Art

Due to the increase in terrorist activity throughout the world and in particular the events surrounding the tragedy of Sep. 11, 2001 in New York City, security has become a subject of increasing concern. One area of particular importance relates to the travel industry which involves processing millions of people on a daily basis. Air travel has received particular scrutiny and is the subject of attempts to greatly increase security measures in order to avoid emergency situations of the type set forth above, resulting in the death of thousands of people.

It is recognized that security measures have been in place for many years at most major airports throughout the world. However, it is commonly recognized that the security procedures previously implemented vary in effectiveness from country to country and are dependent, at least in part, on equipment, personnel and authorizing authorities responsible for the safety of commercial airline travel. Until recently, there has been a steady increase in both passenger and freight traffic on commercial airlines. As such, both passenger and commercial aircraft have increasingly become the targets of terrorist activities. Previously known or recently attempted security procedures appear to concentrate on passengers and cargo prior to being placed on the aircraft as well as the flight conditions and aircraft performance parameters, once the plane is in route.

More specifically, global tracking systems are now in place to monitor the flight of an aircraft from the time of lift-off until the time of landing at its intended destination. Similarly, radar and navigational positioning systems are common place both on the aircraft and at ground tracking stations. In addition, the avionics equipment now required to be present on many commercial aircraft, including electronic monitoring and diagnostic equipment, is structured to operate in a manner which provides both the aircraft crew and the ground tracking personnel a more complete, accurate and up-dated information regarding the flight conditions of the aircraft. Moreover, flight recorders have long been incorporated as standard, required equipment on commercial airliners so as to provide, and maintain a record of each flight. The determination of any malfunction of the aircraft during an emergency situation is thereby facilitated.

More recent attempts to increase the safety of both passenger and cargo travel on commercial airlines have been directed to electronic surveillance not only of the aircraft but of associated facilities utilized to handle passenger and cargo traffic, store and maintain the aircraft and service the aircraft between consecutive flights. On a more sophisticated level, newly developed systems attempt to integrate procedures directed to providing physical, visual and/or audio surveillance as well as monitoring of the environmental security and the condition of the aircraft when not flying. Moreover, known security measures of the type set forth above attempt to overcome vulnerabilities associated with aircraft storage, servicing, as well as access to the aircraft during such periods and/or procedures. By way of example, many critical areas of the aircraft are left exposed, including the operative components associated with the aircraft, such as landing gear, engine housings, airfoil maneuvering components, fueling, etc.

However, one area which is currently being reviewed on a serious basis is recognized as having been neglected for an extended period. This area is the ability of the flight and/or cabin crew, as well as other authorized personnel which may be present on the aircraft, to monitor the activities occurring within the passenger cabin (and/or cargo area) of an aircraft. Of particular importance is the ability to allow the flight crew to observe unusual or emergency activities by passengers on board the aircraft. Emergency situations frequently occur, wherein one or more passengers cause a disruption in the normal in-flight procedures resulting in the flight crew declaring an emergency. Such situations arise from irate or overly stressed passengers as well as those individuals intent on terrorist activities. Emergency conditions on board the aircraft sometimes continue for an extended period without the knowledge of the flight crew. This is further evidence of a lack of an effective means of communicating the occurrence of such activities to the flight crew or other individuals associated with the operation or safety of the aircraft.

Accordingly, there is a significant need for a surveillance system particularly structured to monitor the activities within predetermined portions of an aircraft such as, but not necessarily limited to, the passenger cabin. Such a preferred system should be operational to immediately inform the flight crew of any unusual or obviously dangerous situations occurring within the interior of the aircraft. Further, an improved aircraft surveillance system should allow an accurate and detailed monitoring of emergency events by one or more members of the flight crew within the segregated area of the cockpit without the knowledge that such activities are being monitored. Importantly, an improved surveillance system which overcomes the disadvantages and problems associated with known and/or recently implemented security measures should be structurally and operationally designed to avoid any type of interference with the critical flight systems necessary for the safe and efficient operation of the aircraft.

SUMMARY OF THE INVENTION

The present invention is directed to a surveillance system for monitoring the activity at least within the passenger cabin of a commercial airline and, in certain preferred embodiments, possibly other interior portions of the aircraft. Generally speaking, the surveillance system of the present invention provides for any unusual, emergency or terrorist activity to be selectively communicated to the flight crew so that such activity can be visually monitored, evaluated and dealt with in a manner which best accomplishes the safety of the passengers and crew aboard the aircraft and the continued operation thereof. As will be explained in greater detail hereinafter, structural and operational features of the surveillance system of the present invention include the ability to activate and operate the various components thereof in an operationally isolated manner. Interference with the critical flight systems necessary for the safe and continued operation of the aircraft is thereby eliminated.

More specifically, one preferred embodiment of the present invention comprises a viewing assembly including at least one but preferably two or more cameras strategically placed within the aircraft interior such that images of at least a portion or even the majority of the passenger cabin can be captured. Further, positioning of the one or more cameras of the viewing assembly is such as to provide clear visual observation, when the cameras are activated, of an entry or access area to the cockpit. In addition, one or more primary access portals, used by passengers, may also be clearly observed.

The one or more cameras of the viewing assembly are operatively connected by electrical wiring/conduit defining at least a portion of a control assembly such that image data in the form of captured images is conveyed to a display assembly. As will be explained in greater detail hereinafter, the control assembly serves to interconnect the various operative assemblies and other components of the surveillance system of the present invention in a manner which provides operational isolation and assures non-interference with the critical flight systems associated with the operation of the aircraft.

Further, the display assembly preferably comprises at least one display monitor disposed within the cockpit area of the aircraft in a clear viewing range of one or all members of the flight crew. Moreover, the display assembly may include a plurality of display monitors each concurrently but independently operable through the provision of the aforementioned control assembly, wherein each display monitor is positioned for unimpeded observation by specific members of the flight crew, such as the captain/pilot and the first officer/co-pilot. Naturally, placement of each of a plurality of display monitors is not intended to be limited to observation by only the aforementioned individuals of the flight crew.

Another feature of the surveillance system of the present invention comprises an activation assembly which, in a preferred embodiment, is structured to selectively activate operation of the entire system. More specifically, the one or more cameras associated with the viewing assembly may be normally maintained in a non-operative but "ready" mode. Similarly, the one or more monitors associated with the display assembly are not normally intended to be continuously operated in order that the flight crew is not necessarily distracted by a non-critical system of the aircraft. However, if in the judgment of the cabin crew and/or other authorized personnel, an event or passenger activity occurs which should be immediately reported to the flight crew, the activation assembly functions to immediately switch the one or more cameras of the viewing assembly to an operational mode so that visual images of the interior of the cabin may be captured.

Similarly, the one or more display monitors associated with the display assembly are either automatically activated upon the viewing assembly passing into the operational mode or an alert system or assembly may be made operational. The aforementioned alert system preferably comprises a signal device, such as a signal light disposed in a position within the cockpit which is clearly observable by the flight crew. The signal device may be in the form of a signal light, sounding device or both. Once the alert assembly signals that the viewing assembly has been activated, the flight crew is thereby made immediately aware that activities or events are occurring within the passenger cabin, or other portions of the aircraft interior, which should be visually monitored by the flight crew. As such, the one or more display monitors may be manually activated in order to provide clear observation of the images captured by the one or more cameras of the viewing assembly.

In at least one preferred embodiment, to be described in greater detail hereinafter, the activation assembly includes at least one receiver electrically connected at least to the viewing assembly and the one or more cameras thereof. In addition, the receiver may be electrically connected to both the display assembly and the alert assembly such that all of the operative components of the surveillance system may be concurrently switched to an operational mode. Another feature of at least one preferred embodiment of the present invention comprises the activation assembly including at least one but preferably a plurality of transmitters. The one or more transmitters are intended to be of compact, light weight construction and therefore portable. Further, the size, configuration, and overall structure of the one or more transmitters are such as to facilitate being mounted or supported on the person of one or more members of the cabin crew. Additionally, it is recognized that "air marshals" currently travel on commercial airlines. In such an event, one of the plurality of portable transmitters can also be assigned to an air marshal or other authorized personnel.

Additional features associated with the one or more transmitters include their ability to communicate with the receiver by wireless communication. Moreover, such wireless communication may comprise transmission over a low level radio frequency band, preferably, but not necessarily in the range of 312 megahertz (MHz). Accordingly, the operational range of the one or more transmitters is at least 300 feet and well within the physical confines of the passenger cabin of even the largest commercial airliners. Due to the portable and wireless operational features of the one or more transmitters, they are intended to be variably spaced throughout the aircraft interior, relative to the receiver as they are mounted on and travel with members of the cabin crew or other authorized personnel.

Yet another preferred embodiment of the present invention, which is described in greater detailed hereinafter, includes the provision of a video controller assembly which is disposed in operative, interconnection between the viewing assembly and the display assembly. As such, the video controller assembly serves to selectively control and/or regulate, through operation of one or more members of the flight crew, the distribution of image data from anyone of a plurality of cameras defining the viewing assembly to anyone of a plurality of display monitors defining the display assembly. As with the above noted preferred embodiments, the activation assembly, including at least one receiver and one or more transmitters, may serve to activate the plurality of cameras of the viewing assembly in the manner described.

In cooperation therewith, the video controller assembly provides better flexibility in routing the selected image data from anyone and/or all of the plurality of video cameras distributed throughout the aircraft to anyone or all of a plurality of display monitors also located strategically on or about the flight deck and/or at other appropriate locations throughout the aircraft. It is further emphasized that in addition to the display monitors, which may comprise LCD displays, the image data, through appropriate auxiliary outputs can be distributed through operation of the video controller assembly to other avionics such as electronic flight units or other multi-functional displays.

In addition and in order to preserve the image data, this preferred embodiment of the present invention may include a recorder assembly connected to the video controller and cooperatively structured therewith such that any of the collected image data received from any of the plurality of cameras can be distributed to the video recorder assembly concurrently with or independently of the display of such image data to anyone of the plurality of display monitors. Control and or switching associated with the video controller assembly can be accomplished, by way of example only, through an ARINC 429 serial port. Moreover, operative commands are sent to the video controller assembly over such a serial interface to make the individual output port selection. Further, such operative commands can originate from a dedicated control panel on the flight deck or alternatively from other avionics systems such as, but not limited to, a multi-function display of the type that may already be installed in the aircraft.

The versatility of installation and operation of the video controller assembly is further demonstrated by allowing it to be remotely mounted closer to the camera positions to simplify the wiring required to facilitate image data distribution from any of the cameras to the various display monitors. In such a facilitated installation, all of the camera inputs would go to the video controller assembly, while only a single video line may be required from the video controller assembly to the plurality of display monitors. As a result, much greater flexibility in installation and use would be accomplished by simplifying the overall installation configuration.

Therefore, the surveillance system of the present invention efficiently and effectively serves to monitor the activity within at least the passenger cabin of a commercial aircraft, regardless of its size, type, model etc. Also operative components associated therewith are operationally isolated from the critical flight systems associated with the performance of the aircraft and are therefore structured to not interfere therewith.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
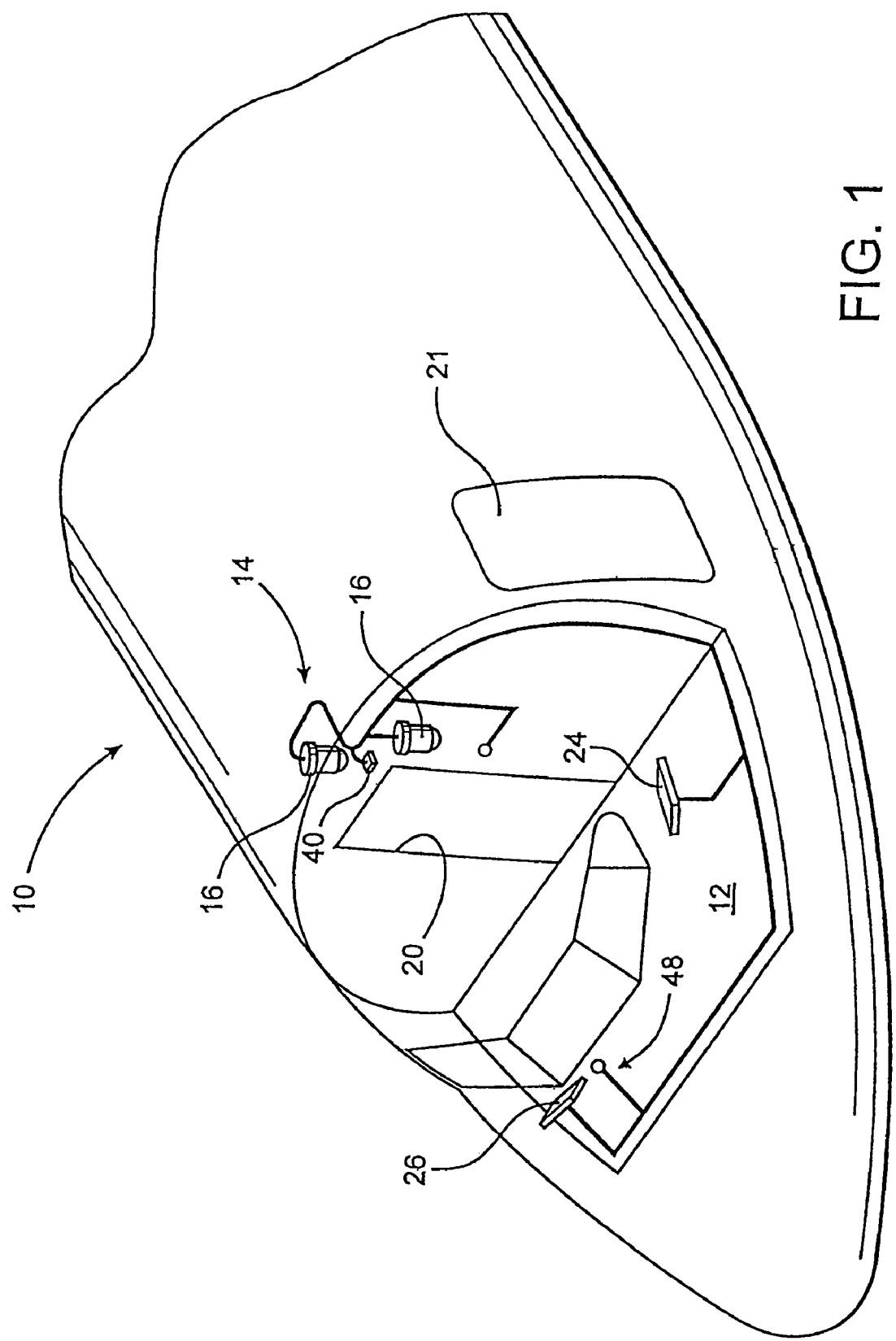
FIG. 1 is a schematic representation in perspective and partial cutaway showing the location of certain operational components of the surveillance system of the present invention on or within an aircraft.

As shown in the accompanying drawings, the present invention is directed to a surveillance system structured to provide visual monitoring of activities within predetermined portions of a commercial or other aircraft, wherein the aircraft is schematically depicted in FIG. 1 as 10. FIG. 1 further represents an interior view of the cockpit or flight deck area 12 absent certain normal structures and features associated therewith, such as the seats for the flight crew, control panels and other operational equipment. The description of the surveillance system of the present invention may specifically, but not exclusively, relate to the aircraft 10 representing series of the DC 9 as well as all series of the MD80. However, it is emphasized that the subject surveillance system is readily adaptable for all commercial and private aircraft including those configured to transport passengers, freight/cargo or both. Accordingly, the surveillance system is structured to allow visual observation and monitoring of predetermined portions of the aircraft interior including, but not limited to, the passenger cabin, by the members of the flight crew located within the cockpit 12 without any member of the flight crew having to leave the flight deck.

Figure 6:
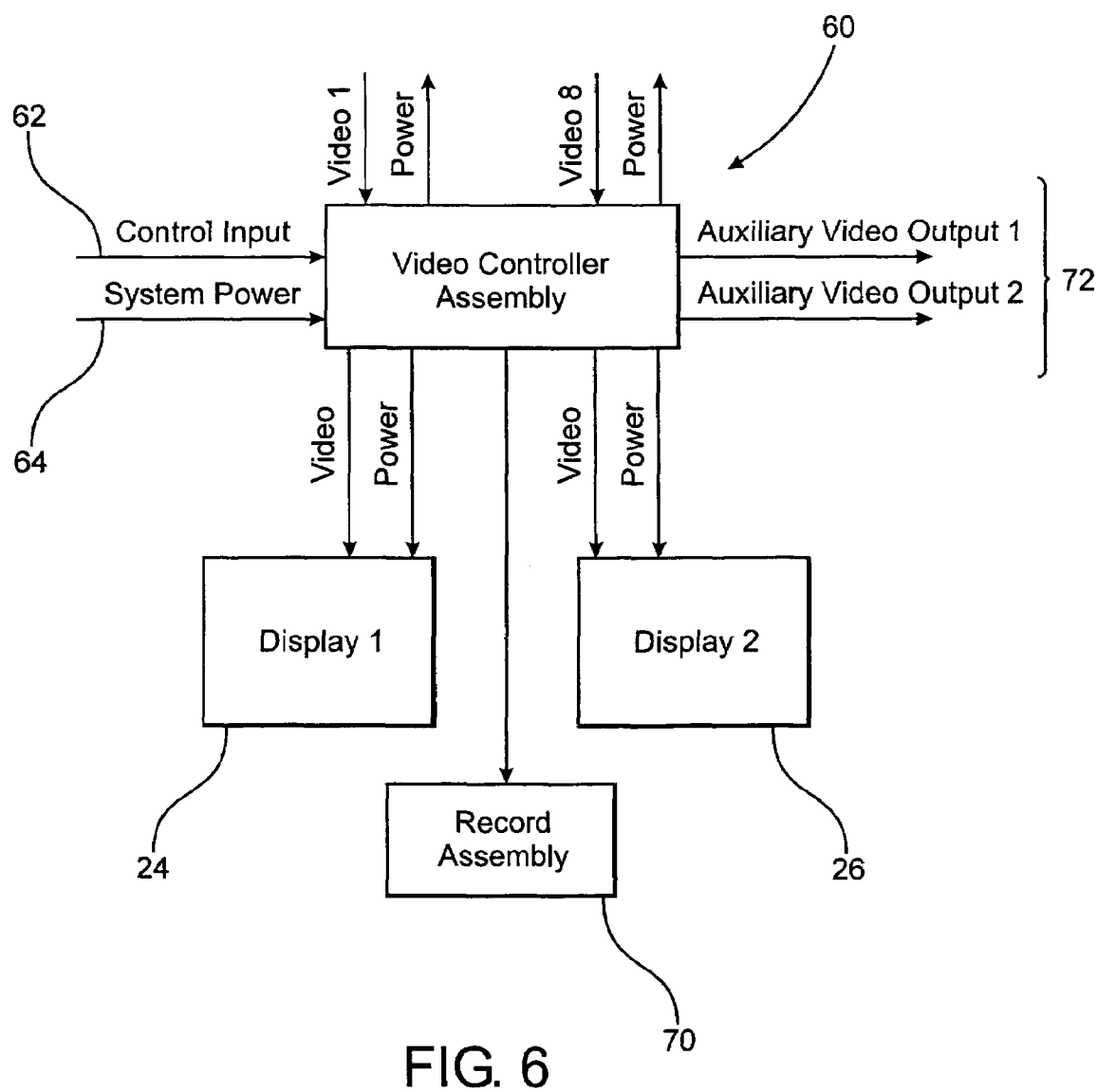
FIG. 6 is a schematic representation in at least partial block diagram form disclosing yet another preferred embodiment of the present invention comprising a video controller assembly structured to selectively regulate the distribution of image data from a viewing assembly to a display assembly of the present invention.

Therefore, the subject surveillance system comprises a viewing assembly generally indicated as 14 and including at least one but preferably a plurality of cameras 16. As shown in both FIGS. 1 and 2 the plurality of cameras 16 are two in number. However, as schematically represented in FIG. 6, at least one preferred embodiment of the present invention comprises a viewing assembly including a larger number of cameras such as, but not necessarily limited to, eight cameras located strategically throughout the predetermined portion of the aircraft interior being monitored, such as the passenger cabin 18 and entrance to the flight deck. As demonstrated in the embodiment of FIGS. 1 and 2, the cameras 16 are secured to and depend from ceiling portions of the passenger cabin interior 18 but may be otherwise located.

In addition, at least one of the cameras 16' may be located above and immediately adjacent the entrance or access area 20 to the flight deck or cockpit 12. In addition, another of the cameras, as at 16", may be located substantially adjacent the cockpit entry 20 but more preferably adjacent the ceiling area of the passenger cabin 18 normally in the vicinity of the forward galley compartment. As such, camera 16' provides a basically unrestricted view of the passenger cabin 18 and specifically the area in front of the cockpit entry 20. In cooperation therewith, camera 16" provides a clear view of any individual positioned adjacent a passenger entry door 21, as well as the area immediately in front of the cockpit entry 20.

In order to facilitate visual observation and image capturing during all flight conditions, each of the cameras 16 are specifically designed for aircraft application. As such each camera 16 may include a light sensor assembly (not shown for purposes of clarity) that senses and triggers an infrared source such as a light emitting diode (LED). The infrared source is activated at light levels which are determined to be below 0.3 lux. Accordingly even in total darkness of zero lux light level, the flight or cockpit crew will be able to visually monitor activities within the passenger cabin, or other predetermined portions of the aircraft interior, in black and white.

However, the light sensor assembly of the present invention is further structured to convey image data in the form of captured images to the flight crew, within the cockpit 12, in color when the determined light level is above 0.3 lux. Further operational characteristics of the camera 16 include a view angle of preferably of 78 degrees, while exceeding a 30 foot horizontal and vertical view which, as set forth above, may be accomplished in total darkness. In should be readily apparent that the one or more cameras 16 may be strategically disposed within predetermined portions of even the largest "wide body" airframe, therefore rendering the surveillance system of the present invention adaptable for use with any commercial airliner.

The surveillance system of the present invention comprises a display assembly including at least one but preferably a plurality of monitors 24 and 26 disposed within the cockpit 12 in clear view of all or particular members of the flight crew. In the preferred embodiment of FIG. 3, display monitor 24 is located adjacent the position of the captain/pilot such that a clear feel of observation and access to the display monitor 24 is present. Similarly, display monitor 26 is located in accessible, observable relation to the first officer/co-pilot. It is emphasized that a single display monitor can be located within the cockpit 12 or alternatively a number of such display monitors 24 or 26 greater than two, dependent upon the size, configuration, etc. of the cockpit 12 and/or the number of individuals associated with the flight crew.

Figure 4:
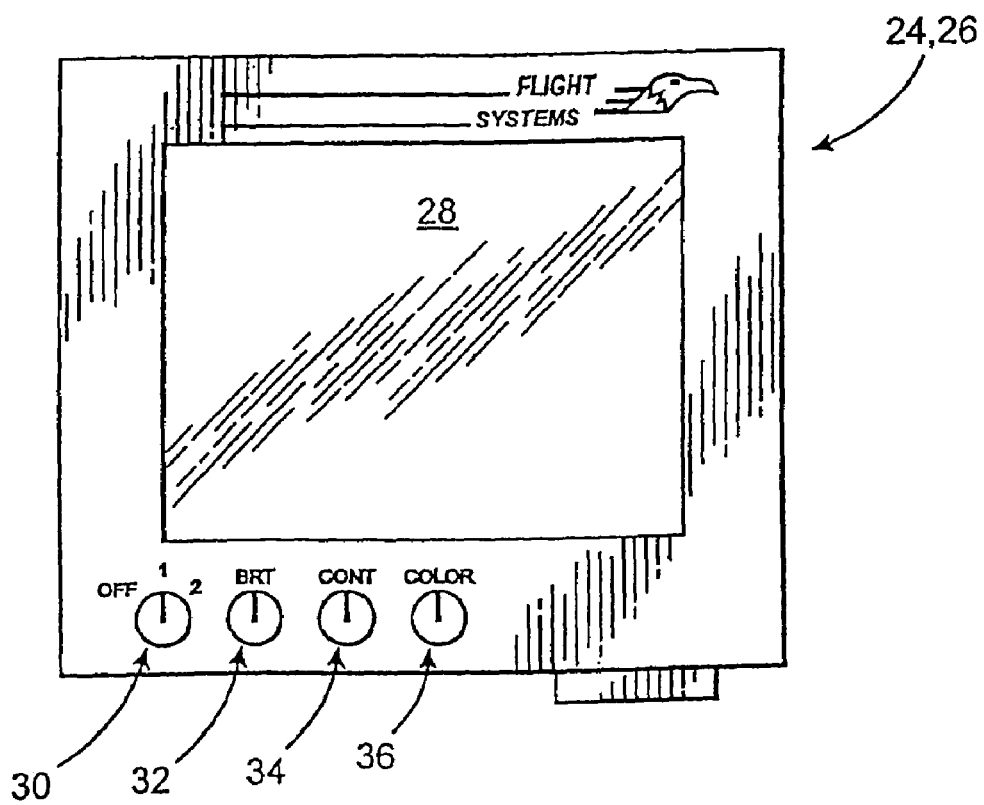
FIG. 4 is front plan view of a display monitor associated with the surveillance system of the present invention.

With primary reference to FIG. 4, each of the display monitors 24 or 26 discloses a display screen 28, which may be in the form of a liquid crystal display (LCD) or other appropriate structure capable of projecting images thereon in both black and white and color, as set forth above. Each of the display monitors 24 and 26 includes operational controls comprising a multi-position switch 30, brightness control 32, contrast control 34 and a color control 36. It should be apparent that operation of the display monitors 24 and 26 is not necessarily dependent on the manually operable controls 30, 32, 34 and 36 and that a greater or lesser number of such controls may be provided.

Yet another feature of the surveillance system of the present invention comprises an activation assembly. The activation assembly, in at least one preferred embodiment of the present invention, is operational to be controlled by the one or more members of the cabin crew such as each of the one or more flight attendants and any other authorized personnel located within the passenger cabin or other portions of the aircraft interior. As such, the activation assembly is operative to selectively actuate any one or all of the cameras 16 of the viewing assembly and concurrently alert members of the cabin crew, located within the cockpit 12 that emergency or other activities within the passenger cabin 18 should be visually monitored.

Figure 5:
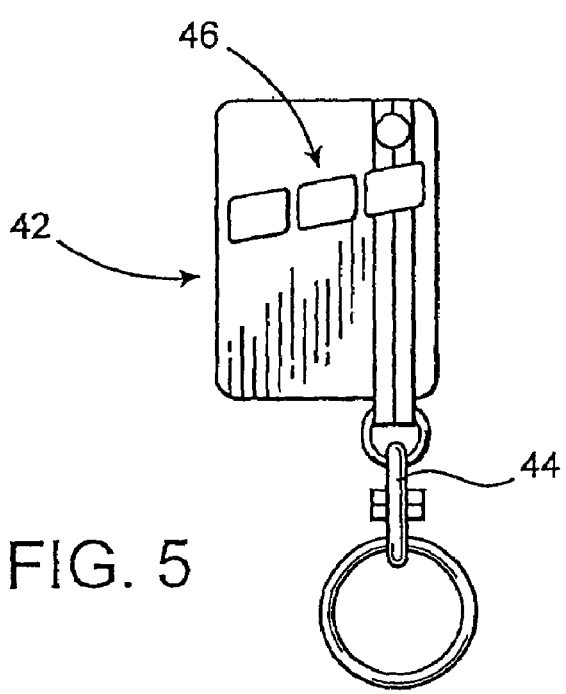
FIG. 5 is a detailed view of one of a possible plurality of transmitters associated with the surveillance system of the present invention.

More specifically, the activation assembly of the present invention comprises at least one receiver 40 located at anyone of a plurality of appropriate locations throughout the aircraft 10 such as, but not limited to, a position adjacent any one of the plurality of cameras 16 of the viewing assembly. The receiver 40 is structured to be responsive, by means of wireless communication with at least one but preferably a plurality of transmitters 42 shown in detail in FIG. 5. Each of the one or more transmitters 42 are of light weight, compact construction so as to be portable and therefore be easily carried or otherwise positioned throughout the interior portion of the aircraft 10, such as within the passenger cabin 18 which is being monitored. As such, each of the one or more transmitters 42 may include a mounting or attachment assembly 44 designed to secure the individual transmitters 42 on the person/clothing of an individual flight attendant of the cabin crew or other authorized personnel, as set forth above. Further, each of the transmitters 42 includes an activation switch or push/pull button 46 cooperatively structured with interior operational components of the plurality of transmitters 42 so as to generate and communicate, through wireless transmission, an activation signal to the receiver 40.

It should be noted that the structural and operational features of all of the components and assemblies, particularly including the activation assembly and the control assembly, to be described in greater detail hereinafter, are structured to be operationally isolated, meaning that their activation, operation, etc. will not interfere with the critical flight systems associated with the operation and performance of the aircraft 10. Accordingly, wireless communication between the one or more transmitters 42 and the receiver 40 may be independent of one another and may operate on a low level radio frequency band of, by way of example only, 312 Mhz. The portable nature of each of the transmitters 42 is such that they may be disposed, such as while being carried on the person of the flight attendants, at variably spaced distances from the receiver 40 and still be efficiently operative to activate the cameras 16, the monitors 24, 26 and/or an alert assembly generally indicated as 48 located within the cockpit or flight deck 12 of the aircraft 10.

Figure 2:
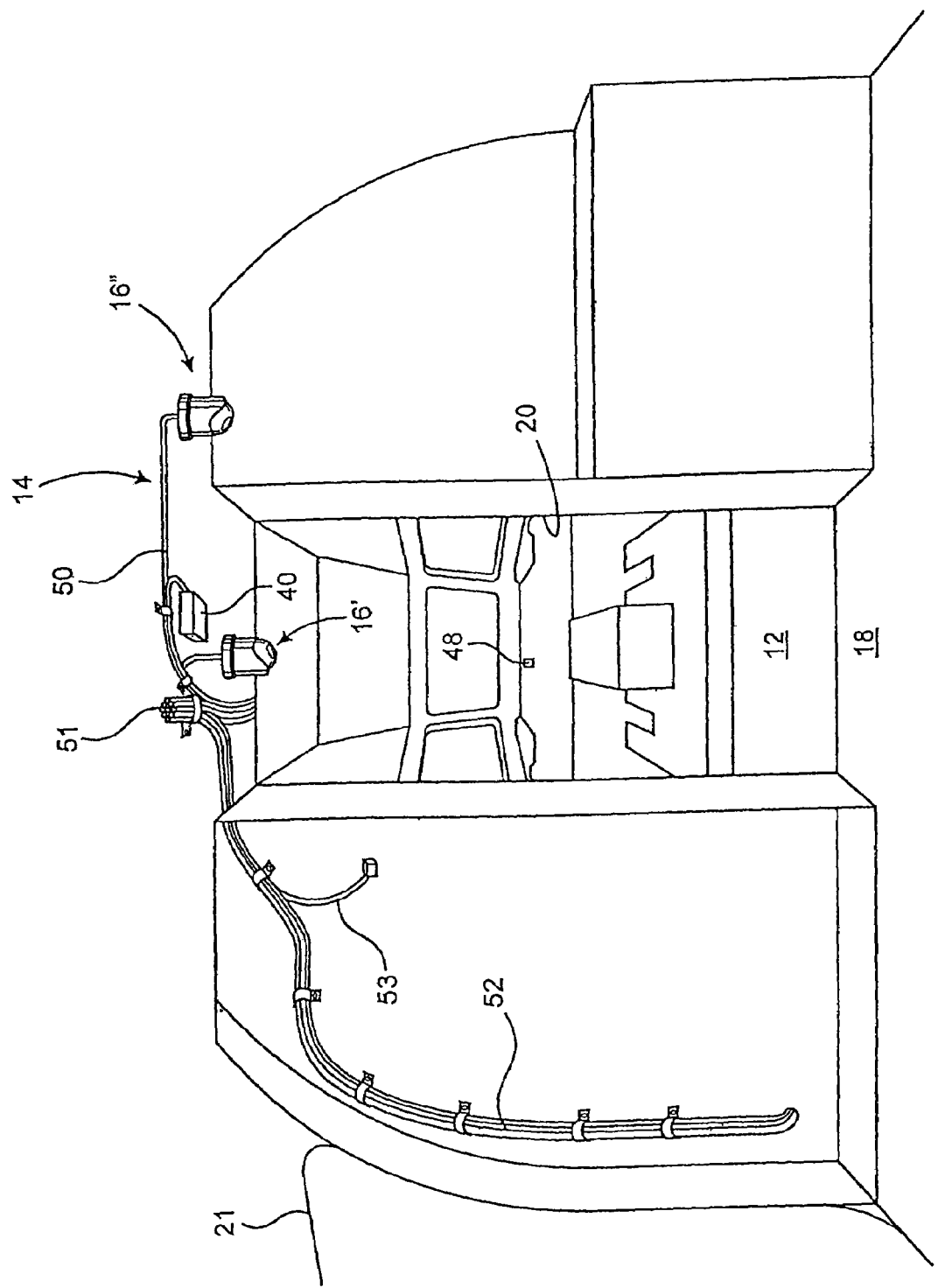
FIG. 2 is a schematic view in perspective and partial cutaway showing the various operative components of the surveillance system of the present invention and their relation to interior portions of the passenger cabin as well as the access area to the flight deck or cockpit.
Figure 3:
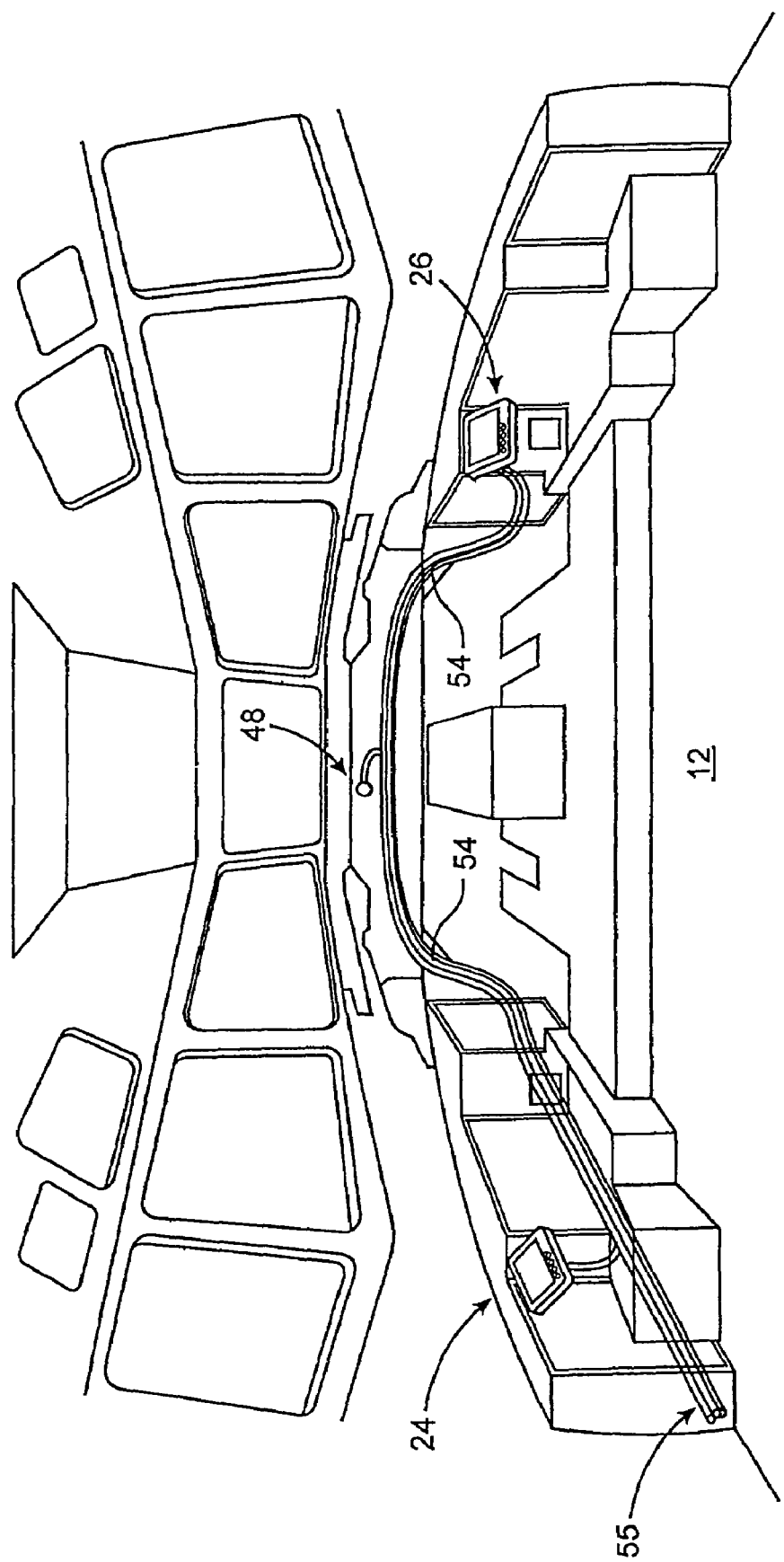
FIG. 3 is a schematic representation in perspective of the interior of the cockpit and location of certain operative components of the surveillance system of the present invention.

Further with reference to the alert assembly 48, at least one signal device, such as a signal light and/or sounding device, may be mounted as indicated in FIGS. 1 through 3 so as to be clearly observable and/or in communication with at least one, but preferably all of the members of the flight crew occupying the cockpit 12. In operation, the occurrence of an emergency event worthy of being monitored by the flight crew within the cockpit 12 will determine activation of the surveillance system of the present invention as one or more individuals of the cabin crew manually depress, or otherwise manipulate, the activation switch or button 46. Depressing the activation button 46 for at least one second will cause an activation signal to be transmitted to the receiver 40. The receiver 40 is connected by the control assembly to the other operative components and assemblies defining the surveillance system of the present invention.

More specifically, the control assembly includes electrical conduit or other appropriate electrical harness structures 50, 52, 53, 54 and 55 preferably mounted on interior, non-observable portions of the airframe of the aircraft 10 as clearly demonstrated in FIGS. 2 and 3. Accordingly, the control assembly serves to interconnect the various operative components, as set forth herein, of the viewing assembly 14 activation assembly, and alert assembly 48. As set forth above, the control assembly, activation assembly and other operative components associated with the remainder of the surveillance system of the present invention are specifically structured to be operationally isolated from the critical flight systems of the aircraft so as to not interfere with operation therewith during flight or other performance of the aircraft.

With primary reference to FIG. 6, the surveillance system of the present invention further comprises yet another preferred embodiment including a video controller assembly generally indicated as 60. The video controller assembly 60 is interconnected between the viewing assembly and the display assembly and is structured to control distribution of image data therebetween. As set forth above, the viewing assembly, in at least one preferred embodiment of the present invention comprises a plurality of cameras 16 which may vary in number such as, but not limited to, eight independent video cameras as schematically represented in FIG. 6.

It is emphasized that the number of video cameras is not limited to 8 but should be sufficient in number to adequately monitor the interior of large passenger and/or commercial aircraft. Further, as demonstrated in FIG. 1 one or more of the cameras should be located at specifically strategic locations, such as to monitor access areas to the aircraft and the flight deck as at 20 and 21. Further, the controller assembly serves to interconnect each of the plurality of video inputs from the plurality of cameras 16 and is structured to facilitate selective distribution of the received image data to anyone of a plurality of display monitors such as at, but not limited to the two display monitors 24 and 26. It is also emphasized that the plurality of display monitors may be greater than the two indicated on the flight deck 24 and 26, wherein it may be determined that an additional number of display monitors may be needed at strategic locations throughout the aircraft to facilitate reliable monitoring of the activity within the aircraft.

As further demonstrated, control input as at 62 may be derived from an interconnection between the control assembly, as set forth above, and the video controller assembly 60. Also the powering of the video controller assembly 60 as well as other operative components, including the plurality of video camera 16 and the plurality of display monitors 24, 26, etc. may come from the main power supply of the aircraft as at 64. Alternatively a plurality of alternative and/or auxiliary/back-up power supplies may be utilized. The video controller assembly 60 is further structured to distribute power there from to the individual cameras 16 as well as each of the plurality of display monitors 24, 26, etc. as schematically represented in FIG. 6.

It is further emphasized that at least one preferred embodiment incorporating the video controller assembly 60 of the surveillance system of the present invention is structured to be cooperatively operational with the remaining operative components and assemblies of the other preferred embodiments described above. As such, the video controller assembly 60 will work in cooperation with the viewing assembly, the display assembly and the activation assembly and be initially activated and/or rendered operational through the control assembly. Another feature of the present invention is emphasized to the extent that the video controller assembly 60 and the various auxiliary components associated therewith is structured to be operationally isolated from critical flight systems of the aircraft.

It is also emphasized that the video controller assembly 60 can be remotely mounted closer to any of the positions of the plurality of cameras 16 to simplify the wiring required to accomplish image data distribution from anyone of the plurality of cameras 16 to anyone of the plurality of display monitors 24, 26, etc. As also indicated above all of the inputs from the plurality of cameras 16 would go directly to the video controller assembly 60, while only a single video line or connection facility would be required to establish interconnection from the video controller assembly 60 to the plurality of display monitors 24, 26, etc. Therefore, a greater degree of flexibility and simplicity would be available in the installation configuration of not only the video controller assembly 60 but in the cooperative interconnection between the video controller assembly 60 and the viewing assembly and display assembly.

While the image data would be primarily distributed from each or all of the video cameras 16 to any one or all the display monitors 24, 26, etc, it is further emphasized that the image data in the form of video output could be routed to a recording assembly 70. A complete and reliable record of activities within the aircraft would be maintained during the operation of the one or more video cameras 16. The recording assembly 70 may take a variety of different structures and operative configurations and may further include structural reinforcement so as to survive intact in the event the aircraft is involved in a crash or other emergency condition.

As also demonstrated in the schematic representation in FIG. 6, the video controller assembly is further structured to distribute the collected image data received from anyone or all of the plurality of video cameras 16 to one or more auxiliary outputs collectively indicated as 72. As such, the image data, can be transferred through such auxiliary outputs to other avionics including electronic components within the aircraft as well as other multi-function displays.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A surveillance system for monitoring activity within an aircraft interior, said system comprising:
   a viewing assembly disposed within the aircraft interior and structured to monitor at least a predetermined portion thereof,
   a display assembly disposed within the aircraft interior in at least partially segregated relation to said viewing assembly,
   a video controller assembly connected to said viewing assembly and said display assembly and structured to control distribution of image data therebetween,
   a control assembly connected to said video controller assembly and structured to regulate operation thereof, and
   said control assembly and said video controller assembly structured to be operatively isolated from critical flight systems of the aircraft.

2. A surveillance system as recited in claim 1 further comprising an activation assembly variably spaced at least in part from said viewing assembly and remotely operative to initiate observation of the aircraft interior; said activation assembly structured to be operationally isolated from critical flight systems of the aircraft.

3. A surveillance system as recited in claim 1 wherein said viewing assembly comprises a plurality of cameras collectively disposed to monitor at least a majority of a passenger cabin of the aircraft interior.

4. A surveillance system as recited in claim 3 wherein said viewing assembly comprises a plurality of cameras, at least one of which is disposed to monitor aircraft interior portions adjacent a cockpit entry.

5. A surveillance system as recited in claim 3 further comprising an activation assembly variably spaced at least in part from said viewing assembly and remotely operative to initiate observation of the aircraft; each of said plurality of cameras operatively responsive to said activation assembly.

6. A surveillance system as recited in claim 3 wherein said video controller assembly is structured to selectively distribute image data from each of said plurality of cameras to said display assembly.

7. A surveillance system as recited in claim 6 wherein said viewing assembly comprises a plurality of display monitors each structured to display images from each of said plurality of cameras and at least one of said plurality of display monitors being disposed within viewing range of a flight crew.

8. A surveillance system as recited in claim 7 wherein said video controller assembly is structured to selectively distribute image data from each of said plurality of cameras to any of said plurality of display monitors.

9. A surveillance system as recited in claim 6 further comprising a recording assembly structured to record image data, said video controller assembly structured to selectively distribute image data from each of said plurality of cameras to said recording assembly.

10. A surveillance system as recited in claim 9 further comprising a recording assembly structured to record image data, said video controller assembly structured to selectively distribute image data from said viewing assembly to said recording assembly.

11. A surveillance system for monitoring activity within an aircraft interior, said system comprising:
   a viewing assembly comprising a plurality of cameras disposed within the aircraft and collectively positioned to monitor at least a majority of a passenger cabin of the aircraft interior,
   a display assembly comprising a plurality of display monitors each structured to display images from said plurality of cameras,
   an activation assembly comprising at least one transmitter and at least one receiver remotely operative and cooperatively structured to selectively initiate operation of anyone of said plurality of cameras,
   a video controller assembly connected to said viewing assembly and said display assembly and structured to selectively distribute image data from said plurality of cameras to said plurality of display monitors,
   a controller assembly connected to said video controller assembly and structured to regulate operation thereof, and
   said controller assembly, said activation assembly and said video controller assembly structured to be operationally isolated from critical flight systems of the aircraft.

12. A surveillance system as recited in claim 11 further comprising a recording assembly structured to record image data, said video controller assembly structured to selectively distribute image data from each of said plurality of cameras to said recording assembly.

13. A surveillance system as recited in claim 11 wherein said at least one of said plurality of cameras is disposed within viewing range of a flight crew.

14. A surveillance system as recited in claim 11 wherein each of said plurality of cameras are responsive to said activation assembly and structured to deliver image data of different aircraft interior portions to any of said plurality of display monitors.

15. A surveillance system as recited in claim 11 further comprising an alert assembly disposed in communicating relation to the flight crew, said alert assembly responsive to said activation assembly and structured to be indicative of activation of said viewing assembly.

16. A surveillance system for monitoring activity within an aircraft interior, said system comprising:
   a viewing assembly comprising a plurality of cameras disposed and structured to monitor predetermined portions of the aircraft interior,
   a display assembly including a plurality of display monitors disposed to be observable by a flight crew,
   an activation assembly including at least one receiver and a plurality of transmitters, said activation assembly structured to selectively activate any of said plurality of cameras,
   said plurality of transmitters independently positionable in variably spaced relation to said receiver within the aircraft interior,
   a video controller assembly connected to said viewing assembly and said display assembly and structured to control image data,
   a controller assembly connected to said video controller assembly and structured to regulate operation thereof.

17. A surveillance system as recited in claim 16 further comprising a recording assembly structured to record image data, said video controller assembly structured to selectively distribute data from any of said plurality of cameras to said recording assembly.

* * * * *